Aug. 2, 1960     R. A. M. ISSARTEL     2,947,334
HAND BRACE
Filed Dec. 27, 1957     2 Sheets-Sheet 1
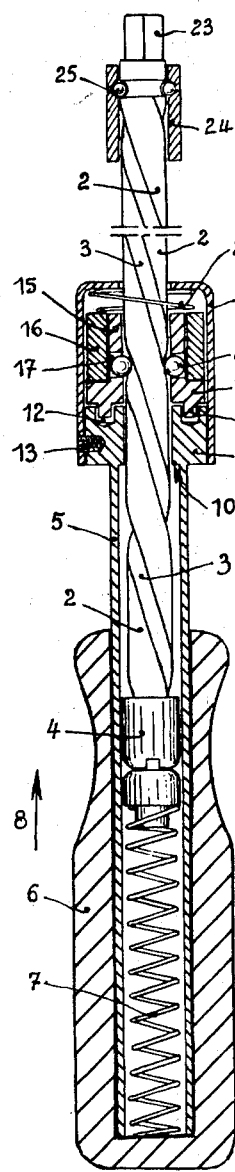
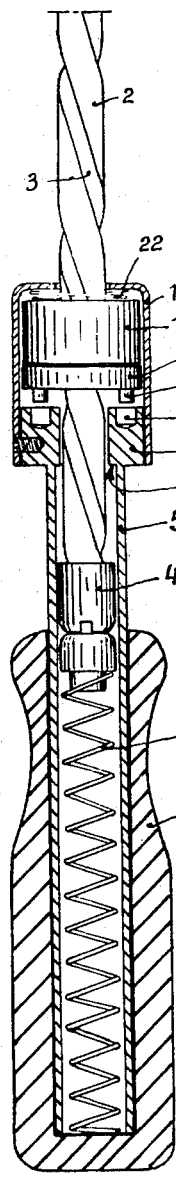
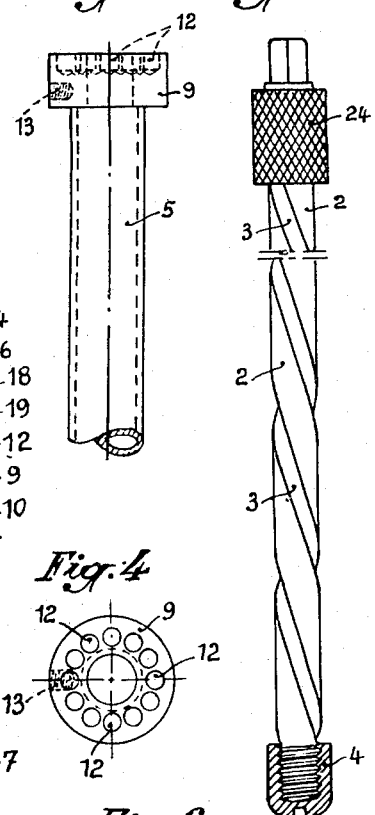
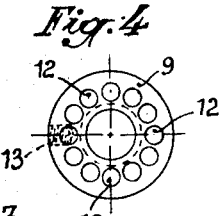
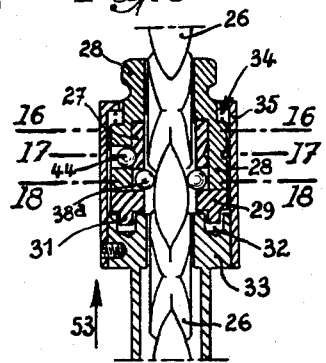

Aug. 2, 1960 R. A. M. ISSARTEL 2,947,334
HAND BRACE
Filed Dec. 27, 1957 2 Sheets-Sheet 2
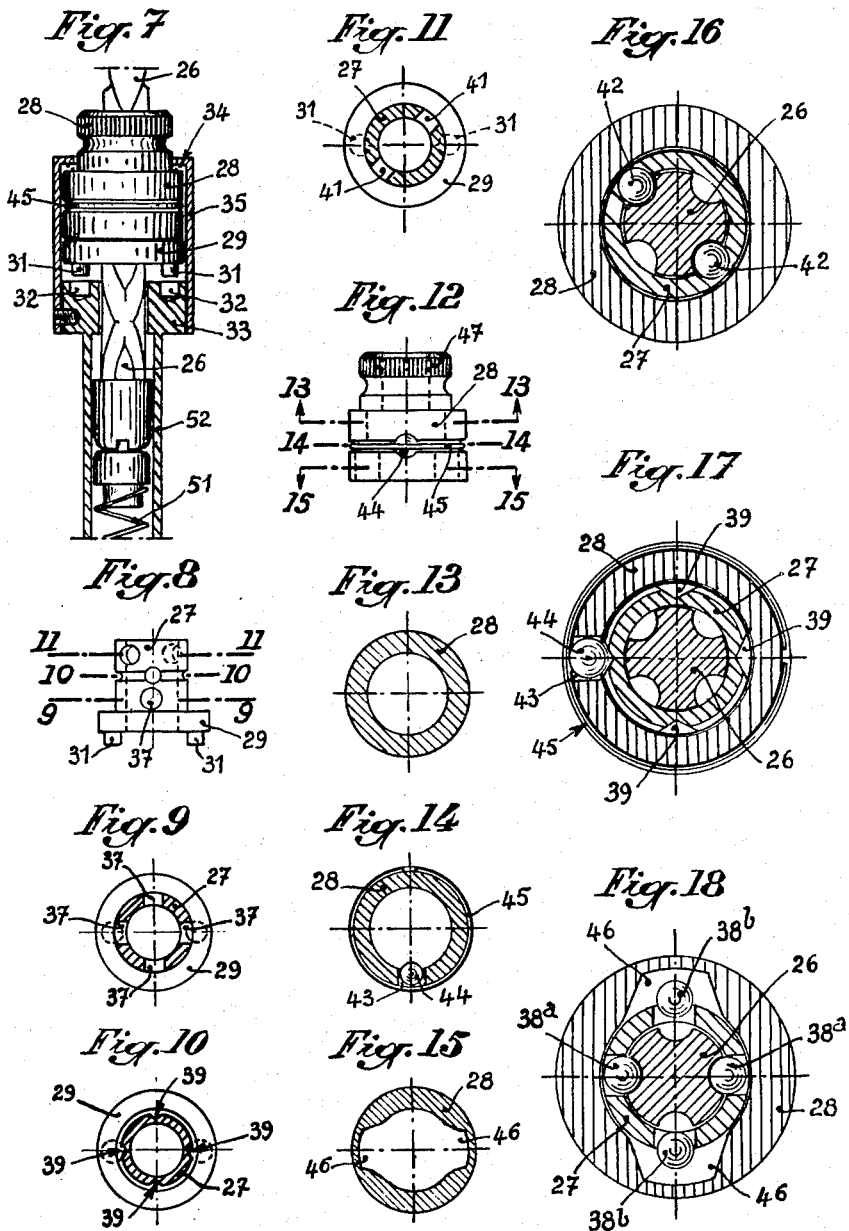

United States Patent Office 2,947,334
Patented Aug. 2, 1960

2,947,334

HAND BRACE

René Antoine Marie Issartel, 62 Rue du Onze Novembre, Saint-Etienne, France

Filed Dec. 27, 1957, Ser. No. 705,554

Claims priority, application France Jan. 5, 1957

3 Claims. (Cl. 145—54)

My invention has for its object a drill or hand-brace of the type wherein the rotation of the tool-carrying worm is controlled by the translational shifting over said worm of a socket or the like part fitted over said worm, with the interposition of balls carried by said part.

Hand-braces of this type are sturdy but they are not very convenient, since the rotation of the worm is obtained through a manual shifting over said worm of the part carrying said balls. The hands of the operator are thus positioned respectively on a grip rigid with the outer end of the worm and on the ball-carrying part. In no case can the operator hold the worm at a point in proximity with the tool, which forms a major drawback.

My invention removes this drawback and has for its object a hand-brace including a rod provided with at least one worm thread, a ball-carrying part and a handle forming the guiding member for the outer end of the threaded rod and containing inside it a spring exerting a thrust on said rod end, said handle terminating with a collar forming a catch system through cooperation with members rigid with a ring carrying at least one ball engaging a thread on the rod, which ring is subjected to the action of another spring urging said ring against the collar, with a view to engaging said catch members with the latter.

The worm-forming rod of my improved hand-brace terminates with a section having a transverse outline which may be square, six-sided or otherwise, so as to allow its fitting inside a socket rigid with the actual tool constituted for instance by a screw-driver, a wrench, a boring drill or the like. In its section extending between the terminal section to which the tool is secured and the corresponding end of the worm thread, the rod of the hand-brace carries a knurled sleeve which is longitudinally stationary but is revoluble over the rod with the interposition of balls; said sleeve forms, in fact, with the handle the two parts through which the hand-brace is to be handled. The operator holds consequently the hand-brace on the one hand through a point of the sleeve in the immediate vicinity of the tool and, on the other hand, through its handle, so that he has merely to exert an axial pressure on said handle to provide for a rotation of the worm in a direction depending on the direction of the pitch of the thread. Said pressure exerted on the handle of the drill produces furthermore and simultaneously a compression of the spring acting on the rod inside said handle.

The expansion of the spring in the handle produces then a return of the handle into its inoperative position without however this leading to any rotation of the threaded rod, since, by reason of its inertia, the ball-carrying ring is released with reference to the collar on the handle and holds the second spring compressed, which second spring, at the end of the expansion of the first spring, returns the catch system into its operative position.

In order to balance the hand-brace and to make it more resistant, while providing greater smoothness of operation, I prefer using for the catch system at least two balls which are diametrically opposed with reference to each other and are carried inside openings provided in the carrier ring, the front transverse surface of which is provided with studs adapted to engage the collar on the tubular handle, said balls being held in their openings by a further ring outwardly coaxial with the first-mentioned ring and positioned inside a cage rigid with the collar on the handle and including a bottom section forming a bearing for the catch-controlling spring.

Said mechanism is of a simple and sturdy structure and its operation is reliable so that it is readily applicable to the execution of hand-braces adapted to rotate as required in either direction, as already known for conventional hand-braces of the worm-and-ratchet type.

I thus obtain braces which associate the advantages of sturdiness of ball hand-braces with the convenient operation of ratchet hand-braces.

My hand-brace includes, according to this latter embodiment, a rod provided with at least one right-handed thread and at least one left-handed thread and the ring subjected to the action of the catch-controlling spring includes at least two balls arranged in registry with threads of opposite pitches, said ring cooperating with a further ring outwardly coaxial with reference thereto and adapted to occupy with reference to it at least two relative angular positions.

Said outer ring is provided in its inner wall with at least one inner recess which allows releasing one of the balls out of the cooperating thread formed in the rod, so that, according to the relative angular position given to the outer ring, either of said balls may be released out of the cooperating thread, while the rod is constrained, during its forward movement, to progress helically in a direction corresponding to that of the pitch of the thread engaging the ball, said rod moving rectilinearly during its return movement, by reason of the disengagement between the ball-carrying ring and the collar on the handle.

The outer ring controlling the direction of rotation of the threaded rod during its forward movement is held in position by at least one other ball which is carried by said ring and is subjected to the action of a spring so as to engage selectively one of say four blind holes uniformly distributed over the periphery of the inner ring, in a manner such that it is possible to pass from one direction of rotation of the rod to the reverse direction through a relative shifting by say 90° of the rings in either direction.

I have illustrated by way of example in the accompanying drawings, and by no means in a limiting sense, two preferred embodiments of my invention. In said drawings:

Fig. 1 is a longitudinal sectional view of a hand-brace adapted to rotate in one direction only, said hand-brace being shown during its forward movement.

Fig. 2 is a partly longitudinal sectional view of said hand-brace during its return movement.

Figs. 3 and 4 show with further detail the stationary tube forming the handle, respectively in elevational view and in end-view.

Fig. 5 is a detail elevational view of the threaded rod.

Figs. 6 and 7 are views respectively in longitudinal cross-section and in part cross-section of the ball-carrying system forming part of a hand-brace operating for both directions of rotation.

Figs. 8, 9, 10 and 11 are views of the inner ring respectively in elevational view and in horizontal cross-sectional views through lines 9—9, 10—10 and 11—11 of Fig. 8.

Figs. 12, 13, 14 and 15 are views of the outer ring respectively in elevational view and in sectional views through lines 13—13, 14—14, 15—15 of Fig. 12.

Figs. 16, 17 and 18 are transverse sectional views respectively through lines 16—16, 17—17 and 18—18 of Fig. 6.

The brace illustrated in Figs. 1 to 5 is chiefly constituted by a rod 2 provided with two threads 3 and ending with a head 4 fitted slidingly inside a tube 5 which forms the handle of the tool and carries a grip 6. Said tube 5 includes in the section extending between the bottom of the grip 6 and the head 4 a helical spring 7 which urges constantly the rod 2 in the direction of the arrow 8 of Fig. 1. At its inner end, the tube 5 terminates with the collar 9 projecting not only outwardly but also inwardly with reference to the tube 5, so as to form a shoulder 10 adapted to act as a stop for the enlarged head 4 of the threaded rod. The rear transverse surface of the collar 9 is provided with a plurality of blind openings 12 distributed along a circumference coaxial with the threaded rod 2.

To the collar 9 is secured through a screw 13 an outer case 14. In the annular gap between said case and the rod 2 are fitted two coaxial rings 15 and 16. The inner ring 15 is provided with two diametrically opposed openings 17 and it is rigid with a collar 18 the front surface of which carries at least two studs 19. Inside said openings 17 are inserted balls 21 which are held in their worm-engaging positions by the second outer ring 16.

A helical spring 22 of a reduced power is fitted between the bottom of the case 14 and the rings 15 and 16. Said spring provides for connection between the ring 15 and the collar 9 through engagement between the studs 19 and the openings 12.

The inner end of the threaded rod or worm 2 forms a polygonal, preferably square end 23 over which may be fitted a tool, such as a screw-driver. In its section comprised between said square end 23 and the end of the thread 3, the rod 2 is provided with a knurled sleeve 24 which is held longitudinally fast on said rod, while it is allowed a free rotation over the latter with the interposition of the balls 25.

When using said hand-brace, the operator holds the latter on the one hand at the level of the sleeve 24 and, on the other hand, through the grip 6 and he provides for the rotation of the tool carried by the hand-brace through a mere axial pressure exerted on the handle 6. The ring 15 thus engages the collar 9 on the handle 5, so that the balls 21 enter a longitudinally stationary position with reference to the tubular handle 5 and to the grip 6. Consequently, the balls, when shifted translationally by the grip and handle, will cause the threaded rod 2 to revolve in the direction corresponding to the direction of the pitch of the threads 3.

When the hand-brace has reached the end of its stroke, i.e. when the spring 7 inside the handle has been completely compressed the operator releases the pressure exerted on the grip 6, so that the spring 7 now returns forwardly the system including the grip 6, the handle 5 and the collar 9; by reason of the inertia of the other system including the balls 21 and the rings 15 and 16, the studs 19 are released with reference to the openings 12 in the collar 9; the hand-brace returns, consequently, into its inoperative position without this leading to any rotation of the threaded rod 2.

In the case where the hand-brace operates in both directions of rotation, and which is illustrated in Figs. 6 to 18, the rod 26 includes four threads two of which have a left-handed pitch and two a right-handed pitch and the balls cooperating with said pairs of threads are carried by an arrangement including chiefly two coaxial rings 27 and 28.

The inner ring 27 which is illustrated in detail in Figs. 8 to 11, includes a collar 29 the front surface of which carries at least two studs 31 adapted to engage two diametrically opposed openings in the stationary collar 33 under the action of the thrust exerted by the helical spring 24 (Figs. 6 and 7) bearing against the stationary bottom of the cage 35, while the free end of said spring bears against the outer ring 28 which bears, in its turn, over the cooperating transverse surface of the collar 29 of the inner ring 27.

The outer periphery of the inner ring 27 is provided in the vicinity of its collar 29 with four blind radial openings 37 distributed at 90° from one another and each of which carries a ball. Said balls diametrically opposed to each other in pairs are designated respectively by the references 38a for one pair and 38b for the other pair, as shown in Fig. 18.

Above said openings 37, the inner ring 27 is provided with four further blind openings 39 or similar recesses (Fig. 10). The inner ring 27 is provided lastly, above said openings 39, with two diametrically opposed openings 41 (Fig. 11) arranged at 45° with reference to the openings 37. These openings 41 form housings for two balls 42, as shown in Fig. 16.

Turning now to the outer ring 28, the latter includes at least one opening 43 provided at the level of the four blind openings 39 in the ring 27 (Fig. 17). Inside said opening or each opening 43 is housed a ball 44 which, as shown in Figs. 6 and 17, is subjected to the action of an elastic sleeve 45 which urges said ball inwardly into a cooperating blind opening 39 in the inner ring 27. The inner periphery of the outer ring 18 is provided furthermore, in its lower section, with two diametrically opposed recesses 46 as shown in Figs. 15 and 18 at the level of the recesses 37 in the inner ring.

The outer ring 28 includes an extension 47 projecting above the cage 35 to allow the operator to turn said ring 28.

The operation of said handbrace is as follows:

The outer ring 28 being positioned over the inner ring 27 in the desired relative angular setting with the interposition of the ball or balls 44, two diametrically opposed lower balls, say the balls 38b, in the case illustrated in Fig. 18, are released with reference to the cooperating worm threads and are housed inside the recesses 46 formed in the outer ring 28. Simultaneously, the two other balls, 38a, are urged into engagement with the two threads facing them, say the two right handed threads. At this moment, the two upper balls 42 carried by the inner ring 27 are housed in the same two threads above the two balls 38b. Consequently, if a thrust is exerted on the grip while the rod 26 is held between two fingers, in registry with its threaded sleeve, said worm rod will be driven into rotation in an anti-clockwise direction.

At the end of its stroke, the handle is released and the spring 51 expands, so as to return the system including the grip, handle and associated parts into their original positions without this leading to a rotation of the threaded rod 26, since, as said associated parts move over the thread, the ring 27 disengages its studs 31 from the openings 32 in the collar 33, while the spring 34 (Fig. 7) remain compressed.

When a further forward movement is applied to the grip; I obtain similarly a further operative movement of the rod 26 and, consequently, of the tool, in an anti-clockwise direction.

If, in contradistinction, it is required to provide for a movement of said rod in a clockwise direction, it is sufficient to shift the outer ring by one quarter of a revolution with reference to the inner ring 27 so that the ball or balls 44 may engage the blind opening or openings 30 located at 90° with reference to those precedingly engaged for anti-clockwise movement. During this angular shifting, the outer ring 28 releases the two balls 38a and brings them into registry with its recesses 46, while it constrains, on the contrary, the balls 38b to enter the threads facing them which are the left-handed threads. Consequently, a shifting of the grip, in the direction of the arrow 33 drawn in Fig. 6, will produce a rotation of the threaded rod 26 and of the tool in a clock-wise direction.

As in the preceding operation, the two upper balls 42 provide for a guiding of the ring 27 over the threaded rod 26, but they move for anti-clockwise operation in the right-handed threads and for clock-wise operation, in the left-handed threads. It is, consequently, necessary, at the moment of the shifting of the outer ring 28 with a view to changing the direction of rotation, for the two upper balls 42 to lie at a crossing point between the left-handed and the right handed threads. It should however be remarked that simultaneously said two balls prevent any angular shifting of the inner ring 27 during the angular shifting imparted to the ring 28 as required for changing the direction of rotation of the threaded rod.

What I claim is:

1. In a hand brace comprising a tool-carrying rod provided with at least one pair of respectively left-pitched and right-pitched threads, a socket-shaped handle slidingly fitted over the rear end of said rod and a main spring compressed between the handle and said rod, the provision of a clutch system comprising a collar rigid with the front end of the handle and surrounding coaxially the rod, and provided with axially directed recesses in its front surface, a first ring fitted slidingly over the rod and provided with radial bores facing alternatingly locations of right-pitched and left-pitched threads and opening into the opposite surfaces of the ring, studs carried by the rear transverse surface of the ring and adapted to operatively engage the corresponding recesses in the collar on the handle, balls carried revolubly by the corresponding radial bores of said ring and engageable with the corresponding helical thread of the rod, a second outer ring coaxially and outwardly fitted over the first ring and engaging the outer surfaces of the balls in the radial bores to urge them into engagement with the rod threads, the inner surface of said ring being provided with recesses registering selectively with the locations of the threads of either direction of pitch along the periphery of the rod to face the balls cooperating with the threads of the same direction of pitch selectively to allow the release of said balls with reference to the said threads, a flange rigid with the handle and the rear surface of which extends transversely of the rod axis and faces the front surface of the rings, and a second spring fitted between said flange and ring and urging the ring into operative engagement with the collar, the expansion of the main spring overcoming the action of the second spring to separate the ring and collar forming the clutch upon holding of the rod against rotation with reference to the handle.

2. In a hand brace comprising a tool-carrying rod provided with at least one pair of respectively left-pitched and right-pitched threads, a socket-shaped handle slidingly fitted over the rear end of said rod and a main spring compressed between the handle and said rod, the provision of a clutch system comprising a collar rigid with the front end of the handle and surrounding coaxially the rod, and provided with axially directed recesses in its front surface, a first ring fitted slidingly over the rod and provided with radial bores facing alternatingly locations of right-pitched and left-pitched threads and opening into the opposite surfaces of the ring, studs carried by the rear transverse surface of the ring and adapted to operatively engage the corresponding recesses in the collar on the handle, balls carried revolubly by the corresponding radial bores of said ring and engageable with the corresponding helical threads of the rod, a second outer ring coaxially and outwardly fitted over the first ring and engaging the outer surfaces of the balls in the radial bores to urge them into engagement with the rod threads, the inner surface of said ring being provided with recesses registering selectively with the locations of the threads of either direction of pitch along the periphery of the rod to face the balls cooperating with the threads of a same direction of pitch selectively to allow the release of said balls with reference to the said threads, said second ring being provided in its inner surface with a transverse opening at a level shifted with reference to that of the radial bores and the first ring being provided with blind peripheral openings uniformly distributed along its outer surface at the level of said transverse openings in the second ring in conformity with the distribution of the successive threads along the periphery of the rod, a ball carried in said transverse opening in the second ring, means urging yieldingly last-mentioned ball selectively into one of the blind openings in the first ring to define the relative angular setting of the recesses in the outer ring with reference to the radial bores in the first ring, and a second spring urging the ring into operative engagement with the collar, the expansion of the main spring overcoming the action of the second spring to separate the ring and collar forming the clutch upon holding of the rod against rotation with reference to the handle.

3. In a hand brace comprising a tool-carrying rod provided with at least one pair of respectively left-pitched and right-pitched threads, a socket-shaped handle slidingly fitted over the rear end of said rod and a main spring compressed between the handle and said rod, the provision of a clutch system comprising a collar rigid with the front end of the handle and surrounding coaxially the rod, and provided with axially directed recesses in its front surface, a first ring fitted slidingly over the rod and provided with radial bores facing alternatingly locations of right-pitched and left-pitched threads and opening into the opposite surfaces of the ring, studs carried by the rear transverse surface of the ring and adapted to operatively engage the corresponding recesses in the collar on the handle, two pairs of balls carried revolubly by the corresponding radial bores of said ring and engageable with the corresponding helical threads of the rod, a second outer ring coaxially and outwardly fitted over the first ring and engaging the outer surfaces of the balls in the radial bores to urge them into engagement with the rod threads, the inner surface of said ring being provided with two diametrically opposed recesses registering selectively with the location of the threads of either direction of pitch along the periphery of the rod to face the balls cooperating with the threads of a same direction of pitch selectively to allow the release of said balls with reference to the said threads, said second ring being provided in its inner surface with a transverse opening at a level shifted with reference to that of the radial bores and the first ring being provided with four blind peripheral openings uniformly distributed along its outer surface at the level of said transverse openings in the second ring in conformity with the distribution of the successive threads along the periphery of the rod, a ball carried in said transverse opening in the second ring, means urging yieldingly last-mentioned ball selectively into one of the blind openings in the first ring to define the relative angular setting of the recesses in the outer ring with reference to the radial bores in the first ring, said outer ring being provided with a further opening in its inner surface, a ball carried by said further opening in the outer ring and registering for the inoperative position of the handle and rod with the crossing of two threads of opposite pitches and adapted to move upon angular shifting of the rod along that thread having the same pitch as the threads engaged by the unreleased operative pair of first-mentioned balls, and a second spring urging the ring into operative engagement with the collar, the expansion of the main spring overcoming the action of the second spring to separate the ring and collar forming the clutch upon holding of the rod against rotation with reference to the handle.

References Cited in the file of this patent

UNITED STATES PATENTS

| | | |
|---|---|---|
| 454,929 | Day | June 30, 1891 |
| 520,519 | Edwards | May 29, 1894 |
| 597,766 | Furbish | Jan. 25, 1898 |
| 1,304,714 | Starrett | May 27, 1919 |
| 1,971,289 | Abramson et al. | Aug. 21, 1934 |
| 2,664,126 | Mansfield et al. | Dec. 29, 1953 |